10

United States Patent Office 3,311,631
Patented Mar. 28, 1967

3,311,631
METHOD OF PREPARING PHENANTHRIDINES
Harry Chafetz, Poughkeepsie, N.Y., and Richard C. Anderson, Logan, Utah, assignors to Texaco Inc., New York, N.Y., a corporation of Delaware
No Drawing. Filed Mar. 31, 1964, Ser. No. 356,030
2 Claims. (Cl. 260—283)

The subject invention relates to a novel method of preparing phenanthridines. More particularly, it relates to a catalytic method of preparing a phenanthridine and 6-hydrocarbyl phenanthridine from 2-(cyclohexenyl)-cyclohexanone, hydrocarbyl aldehyde and ammonia.

The phenanthridine products of the invention are useful as corrosion inhibitors in acid pickling solutions for metals and as intermediates in the preparation of phenidium chloride and dimidium bromide type compounds which are useful in the treatment of African trypanozmiases in cattle.

In the past, one of the methods of preparing phenanthridines was the step sequence of (1) converting fluorenone to fluorenone oxime, (2) subjecting fluorenone oxime to a Beckman rearrangement with phosphorous pentachloride to form phenanthridone, (3) treating the phenanthridone with phosphoryl trichloride to form the phenanthridine chloride, (4) reducing the phenanthridine chloride to phenanthridine by catalytic hydrogen reduction. If desired the phenanthridine product is then alkylated to form the alkyl substituted phenanthridines.

We have found and this constitutes our invention a relatively simpler method than described above for preparing phenanthridines of the formula:

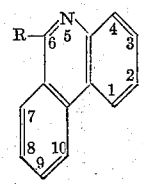

where R is a substituent selected from the group consisting of hydrogen and alkyl, alkenyl, aryl, alkaryl and aralkyl of from 1 to 20 carbons.

Specifically, we have found phenanthridine and 6-hydrocarbyl phenanthridine can be prepared by contacting a mixture of ammonia, 2-(1-cyclohexenyl)-cyclohexanone and hydrocarbyl aldehyde of the formula RCHO where R is as heretofore defined in the presence of cyclization catalyst and in the absence of oxygen to form an octahydrophenanthridine intermediate of the formula:

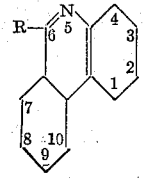

where R is as heretofore defined. In the preparation of the octahydrophenanthridine intermediate the reaction temperature is advantageously maintained between about 180 and 425° C. and the mole ratio of ammonia/aldehyde/cyclohexenyl cyclohexanone is between about 100:5–1:1 and 1:5–1:1.

Standard procedures may be employed in eliminating oxygen from the reaction zone such as sweeping said zone prior to the reaction with inert gas such as nitrogen. Oxygen removal is required so as to prevent undesirable, competing oxidation reactions.

The cyclization catalysts contemplated herein are alumina, silica, silica-alumina, and silica or alumina in combination with a minor amount (e.g. between about 5–40 wt. percent of chromia or magnesia). Under preferred conditions the cyclization catalyst particle size is between $\frac{1}{16}$ and ½ inch and the contact time between reactants and catalyst is between 3 and 20 seconds. Further, the reaction is normally conducted at atmospheric pressure but subatmospheric and superatmospheric pressures up to about 50 p.s.i.g. may also be employed.

In the second phase of the reaction procedure, the formed octahydrophenanthridine intermediate described above is dehydrogenated into the corresponding phenanthridine of the formula:

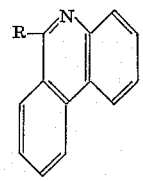

where R is as heretofore defined, by contacting said intermediate at a temperature between about 200 and 400° C. in the presence of an inert gas sweep with a dehydrogenation catalyst selected from Group VIII metals of the Periodic Table.

In the dehydrogenating phase of the procedure, a critical feature is the maintenance of an inert gas sweep. The purpose of this sweep is to remove the formed hydrogen and thereby prevent regeneration of the octahydrophenanthridine intermediate through equilibrium conditions. An example of inert gas contemplated is nitrogen.

In regard to the reaction pressure, the conditions employed are essentially the same as described in respect to the octahydrophenanthridine preparation phase of the method.

In regard to the dehydrogenation catalysts, specific examples are palladium, platinum, rhodium and nickel. They may be impregnated on a carrier such as carbon (e.g. charcoal). One preferred catalyst is between about 2 and 10 wt. percent palladium on charcoal. Under preferred conditions the particle size of the catalyst is between about $\frac{1}{100}$ and ¼" diameter.

The following examples further illustrate the invention but are not to be taken as limitations thereof.

Example I

The reaction was conducted in the vapor phase and carried out in a 1 x 24" Vycor tube enclosed in an electric furnace. The temperature was sensed by a thermocouple located at the center of the heating chamber external to the glass tube. The tube was inclined at an angle of about 20° from horizontal and was packed with a 6" layer of Berl saddles at the bottom, a 7" layer of catalyst comprising 12.1 wt. percent chromia, 87.9 wt. percent alumina in the middle and a 6" layer of Berl saddles at the top. The tube was fitted at its upper end with an adaptor connected to a dropping funnel and a system for introducing a metered flow of ammonia gas. The bottom end of the tube was connected to the receiver attached to a water cooled condenser followed by a trap cooled in a Dry Ice-isopropanol mixture.

The prepared reaction tube was preheated at 450° C. for about ½ hour while being swept with 200 mls./minute of dry nitrogen and then allowed to cool to 350° C. The nitrogen stream was cut off and the ammonia gas was passed through the tube at a rate of 200 mls./minute together with equimolar amounts of 2-(1-cyclohexenyl)-cyclohexanone and n-hexaldehyde added at a rate of 3 drops/minute. The total amount of cyclohexanone added was 30 grams (0.2 mole) and the total amount of hexaldehyde added was 20 grams (0.2 mole). The residence time of the reactants in the tubular reactor was 2.7 seconds and the molar ratio of ammonia:ketone:aldehyde was 12/0.5/0.5. The condensation products were collected in the receiver and analyzed by gas chromatography. The fraction having a boiling point of between about 186 and 190° C. at 3 mm./Hg, a density at 20/4° C. of 1.0071 and at 25/4° C. of 0.9997, a refractive index at $n_D^{20}$ of 1.5455 and at $n_D^{25}$ of 1.5399 was identified by gas chromatography as 6-pentyl-1,2,3,4,7,8,9,10-octahydrophenanthridine weighing 33.4 grams giving a yield of 65 mole percent based on the charged ketone compound. This product had a strong infrared absorption band at 6.42 and no weak bands at 2.95 and 6.05.

*Example II*

This example illustrates the conversion of the octahydrophenanthridine intermediate into the phenanthridine product.

The experimental runs reported below were carried out in a 100 ml. reaction flask fitted with a condenser, a stirrer having a hollow shaft for gas dispersion and a thermometer. The 6 - pentyl-1,2,3,4,7,8,9,10-octahydrophenanthridine of the type produced in Example I and a catalyst comprising 10 wt. percent palladium on 90 wt. percent charcoal were added to the reaction flask. The stirrer was activated and in some of the experimental runs the hydrogen by-product was eliminated from reactor atmosphere by passing nitrogen gas through the stirrer at a rate of 20 mls./minute during the reaction. The reaction flask was heated to the desired temperature until the evolution of hydrogen appeared to have ceased. The products were isolated by vacuum distillation and analyzed by gas chromatography. One fraction boiling at 181° C./1 mm. Hg, forming a salt of picric acid melting at 165–166.6° C. and a hydrochloride salt melting at 112–118° C. was identified as 6-pentylphenanthridine. Data for the experimental runs are summarized below in Table I:

TABLE I—DEHYDROGENATION OF 6-PENTYL-1,2,3,4,7,8,9,10-OCTAHYDROPHENANTHRIDINE TO 6-PENTYLPHENANTHRIDINE

| Run No. | A | B | C | D | E |
|---|---|---|---|---|---|
| Charge, grams: | | | | | |
| Octahydrophenanthridine | 3.6 | 5.0 | 15.0 | 20.0 | 50.0 |
| Catalyst | 0.5 | 1.0 | 5.0 | 4.0 | 5.0 |
| Conditions: | | | | | |
| Nitrogen Sweep | No | No | No | Yes | Yes |
| Temp. °C | 275–325 | 325 | 230–250 | 340–360 | 200–270 |
| Heating Time hrs | 7 | 2.5 | 1 | 2.3 | 1.5 |
| Yield of 6-pentylphenanthridine mole percent | 10 | 10 | 10 | 62 | 70 |

As can be seen from the above data continuous removal of hydrogen by-product as characterized by the nitrogen sweep is essential for good yields.

In addition to the foregoing, further examples of aldehyde reactants contemplated herein are formaldehyde, acetaldehyde, propionaldehyde, isobutenal, heptaldehyde, myristaldehyde, benzaldehyde, 4-methylbenzaldehyde and naphthylethanal. Corresponding octahydrophenanthridine intermediates and phenanthridine products are 1,2,3,4,7,8,9,10-octahydrophenanthridine,
6-methyl-1,2,3,4,7,8,9,10-octahydrophenanthridine,
6-ethyl-1,2,3,4,7,8,9,10-octahydrophenanthridine,
6-isopropenyl-1,2,3,4,7,8,9,10-octahydrophenanthridine,
6-hexyl-1,2,3,4,7,8,9,10-octahydrophenanthridine,
6-tridecyl-1,2,3,4,7,8,9,10-octahydrophenanthridine,
6-phenyl-1,2,3,4,7,8,9,10-octahydrophenanthridine,
6-(4-methylphenyl)1,2,3,4,7,8,9,10-octahydrophenanthridine
6-naphthylmethyl-1,2,3,4,7,8,9,10-octahydrophenanthridine,
phenanthridine,
6-methyl-phenanthridine,
6-ethyl-phenanthridine,
6-isopropenylphenanthridine,
6-hexyl-phenanthridine,
6-tridecyl-phenanthridine,
6-phenyl-phenanthridine,
6-(4-methylphenyl)-phenanthridine and
6-naphthylmethyl-phenanthridine.

We claim:
1. A method of preparing a phenanthridine of the formula

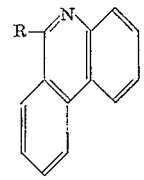

where R is a substituent selected from the group consisting of hydrogen and alkyl, aryl, alkenyl, alkaryl and aralkyl of from 1 to 20 carbons, comprising contacting ammonia, an aldehyde of the formula RCHO where R is as heretofore defined, and 2-(1-cyclohexyl)-cyclohexanone in a molar ratio of between about 100:5–1:1 and 1:5–1:1 with a cyclization catalyst selected from the group consisting of silica, alumina, silica-alumina, silica-5 to 40 wt. percent magnesia, silica-5 to 40 wt. percent chromia, alumina-5 to 40 wt. percent magnesia, alumina-5 to 40 wt. percent chromia and mixtures thereof, at a temperature between about 180 and 425° C. and in the absence of oxygen to form an intermediate octahydrophenanthridine of the formula:

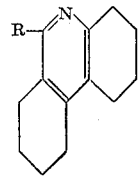

where R is as heretofore defined, and subsequently heating said octahydrophenanthridine intermediate in the presence of an inert gas sweep and a dehydrogenation catalyst selected from Group VIII of the Periodic Table at a temperature between about 200 and 400° C. to form said phenanthridine.

2. A method in accordance with claim 1 wherein said cyclization catalyst is alumina-chromia, said dehydrogenation catalyst is palladium, said aldehyde is n-hexaldehyde and said R is pentyl.

No references cited.

ALEX MAZEL, *Primary Examiner.*

DONALD G. DAUS, *Assistant Examiner.*